(12) United States Patent
Sullivan et al.

(10) Patent No.: US 11,398,787 B2
(45) Date of Patent: Jul. 26, 2022

(54) OPTIMIZING COMPARATOR OPERATION FOR A VARYING DC COMPONENT INPUT

(71) Applicant: Texas Instruments Incorporated, Dallas, TX (US)

(72) Inventors: Matthew Sean Sullivan, Dallas, TX (US); Arun Tej Vemuri, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 47 days.

(21) Appl. No.: 16/008,262

(22) Filed: Jun. 14, 2018

(65) Prior Publication Data
US 2019/0006970 A1 Jan. 3, 2019

Related U.S. Application Data

(60) Provisional application No. 62/527,841, filed on Jun. 30, 2017.

(51) Int. Cl.
*H02P 7/29* (2016.01)
*H02P 6/08* (2016.01)
*H02P 7/00* (2016.01)
*G01P 3/46* (2006.01)
*G01P 3/48* (2006.01)

(52) U.S. Cl.
CPC .............. *H02P 7/2913* (2013.01); *G01P 3/46* (2013.01); *G01P 3/48* (2013.01); *H02P 6/08* (2013.01); *H02P 7/0094* (2013.01)

(58) Field of Classification Search
CPC ........ H02P 7/2913; H02P 6/08; H02P 7/0094; G01P 3/48; G01P 3/46
See application file for complete search history.

(56) References Cited

U.S. PATENT DOCUMENTS

| | | | | |
|---|---|---|---|---|
| 5,126,642 A | * | 6/1992 | Shahrodi | H02P 27/08 318/268 |
| 6,078,154 A | * | 6/2000 | Manlove | H02P 6/18 318/293 |
| 6,094,022 A | * | 7/2000 | Schillaci | H02P 6/182 318/400.35 |
| 2010/0008012 A1 | * | 1/2010 | Ben-Yaakov | H05C 1/02 361/232 |
| 2011/0270558 A1 | * | 11/2011 | Knezevic | G01P 3/44 702/65 |
| 2012/0188009 A1 | * | 7/2012 | Alexander | H03F 3/45973 330/69 |
| 2014/0001815 A1 | * | 1/2014 | Tanaka | H02P 7/29 318/474 |
| 2016/0320208 A1 | * | 11/2016 | Yokoo | H02P 6/182 |

* cited by examiner

*Primary Examiner* — Muhammad S Islam
*Assistant Examiner* — Bradley R Brown
(74) *Attorney, Agent, or Firm* — Ray A. King; Charles A. Brill; Frank D. Cimino

(57) ABSTRACT

In one embodiment, an apparatus includes a different amplifier. A node in the apparatus receives a motor-current signal and an output of the differential amplifier. The motor-current signal represents a motor current of a DC brush motor. Moreover, a first input of the differential amplifier is coupled to a node. The apparatus also includes a low-pass filter with an input receiving a motor-current signal and an output coupled to a second input of the differential amplifier. The apparatus additionally includes a comparator with a first input coupled to the output of the differential amplifier and a second input coupled to a referential voltage.

12 Claims, 4 Drawing Sheets

OPTIMIZING COMPARATOR OPERATION FOR A VARYING DC COMPONENT INPUT

PRIORITY

This application claims the benefit, under 35 U.S.C. § 119(e), of U.S. Provisional Patent Application No. 62/527,841, filed 30 Jun. 2017, which is incorporated herein by reference.

TECHNICAL FIELD

This disclosure generally relates to optimizing a signal, and in particular optimizing a signal for a comparator.

BACKGROUND

Back-electromagnetic force ("BEMF") affects the motor current entering a Direct Current ("DC") brush motor. As the DC brush motor rotates, the impedance seen by the BEMF periodically changes due to the nature of the DC motor brushes making contact with multiple poles of the motor and effectively shorting some of the motor windings. This change in impedance changes the motor current in a periodic pattern proportional to the actual speed of the motor.

In some cases, the motor current contains a large-signal component (i.e., DC component) of the input signal that can largely vary in comparison to the small-signal component (i.e., AC component) of the input signal. In particular, during start and stop conditions that generate a large change in current, the motor current does not retain a constant large-signal component.

SUMMARY OF PARTICULAR EMBODIMENTS

This disclosure utilizes a DC brush motor ripple counter to provide a digital logic level series of rising and falling edges that retains a ripple frequency component of a DC brush motor even during start and stop conditions. In one embodiment, an apparatus includes a differential amplifier. A node in the apparatus receives a motor-current signal and an output of the differential amplifier. The motor-current signal represents a motor current of a DC brush motor. Moreover, a first input of the differential amplifier is coupled to a node. The apparatus also includes a low-pass filter with an input receiving a motor-current signal and an output coupled to a second input of the differential amplifier. The apparatus additionally includes a comparator with a first input coupled to the output of the differential amplifier and a second input coupled to a referential voltage.

The disclosure may present several technical advantages. A technical advantage of the DC brush motor ripple counter may include an increase in the accuracy of sensing ripples in a brushed DC motor. An additional technical advantage of the DC brush motor ripple counter may include minimizing the complexity of DC brush motor ripple counters due to false ripple count readings. An additional technical advantage of the DC brush motor ripple counter may include minimizing the error correction necessary due to false ripple count readings. An additional technical advantage is a reduction in DC brush motor complexity by removing the need for position sensors mounted in the motor itself.

Other technical advantages of the present disclosure will be readily apparent to one skilled in the art from the following figures, descriptions, and claims. Moreover, while specific advantages have been enumerated above, various embodiments may include all, some, or none of the enumerated advantages.

Moreover, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims, wherein any feature mentioned in one claim category, e.g. method, can be claimed in another claim category, e.g. apparatus, as well.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps disclosed may be optional. It will also be appreciated with the benefit of this disclosure that one or more components illustrated in the accompanying figures may be positioned in other than the disclosed arrangement and that one or more of the components illustrated may be optional.

DESCRIPTION OF EXAMPLE EMBODIMENTS

Due to the effect that the back-electromagnetic force ("BEMF") has on the motor current seen entering the motor, a sensorless position measurement approach is possible for brushed Direct Current ("DC") motors. As the motor rotates, the impedance seen by the BEMF periodically changes due to the nature of the DC motor brushes making contact with multiple poles of the motor and effectively shorting some of the motor windings. This change in impedance changes the measured current in a periodic pattern proportional to the actual speed of the motor.

However, during start and stop conditions that generate a large change in current, the measured current does not retain a constant DC point to accurately measure the motor rotation. Moreover, due to the low speed of the signal, a simple DC-blocking resistor-capacitor ("RC") filter does not solve this issue as the DC-blocking RC filter creates a large time-constant and outputs an improperly-biased signal. The large time constant generated by the DC-blocking RF filter especially shows its effects on the signal during the large initial spike in motor current at start-up. This current spike is too large and too slow to be effectively filtered by a high-pass filter (e.g., the DC-blocking RC filter). In addition, the value for the RC time-constant means that the low-frequency DC component of the signal does not rapidly settle to a resting point. In turn, a comparator may falsely detect and/or miss multiple ripples for counting when the signal is not stable.

In one embodiment, an apparatus includes a different amplifier. A node in the apparatus receives a motor-current signal and an output of the differential amplifier. The motor-current signal represents a motor current of a DC brush motor. Moreover, a first input of the differential amplifier is coupled to a node. The apparatus also includes a low-pass filter with an input receiving a motor-current signal and an output coupled to a second input of the differential amplifier. The apparatus additionally includes a comparator with a first input coupled to the output of the differential amplifier and a second input coupled to a referential voltage.

The DC bias adjustment circuit results in a properly-biased signal with little-to-no DC-component variance especially during start and stop conditions. In particular, the DC bias adjustment circuit, alongside several other components, provides a way to provide a digital logic level series of rising and falling edges retaining the ripple frequency component for a digital processor to count and analyze even during start and stop conditions.

Figure 1:
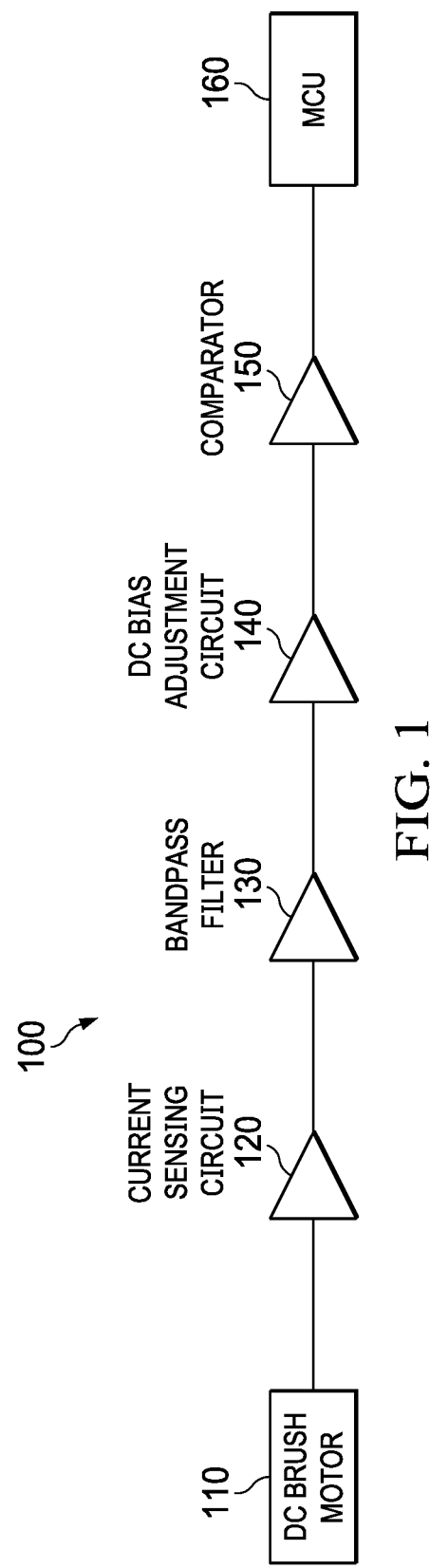
FIG. 1 illustrates an exemplary system diagram of a DC brush motor ripple counter.

FIG. 1 illustrates an exemplary system diagram of DC brush motor ripple counter 100. DC brush motor ripple counter 100 may comprise DC brush motor 110, current sensing circuit 120, bandpass filter 130, DC bias adjustment circuit 140, comparator 150, and microcontroller unit ("MCU") 160.

DC brush motor 110 is a brushed DC motor that has an internal commutated electric motor. DC brush motor 110 may comprise a stator, a rotor (or armature), brushes, and a commutator. The stator typically generates a stationary magnetic field that surrounds the rotor, using either permanent magnets or electromagnetic windings. Moreover, the rotor is made of one or more windings that can produce a magnetic field when energized. The magnetic poles of the magnetic field generated by the rotor will attract to the opposite poles generated by the stator, thereby causing the rotor to run. As the rotor turns, the windings may be constantly energized by the commutator located on the axle of the rotor. Specifically, as the rotor turns, brushes on the rotor touch different energized segments of the commutator, thereby becoming energized.

While illustrated as DC brush motor 110, DC brush motor 110 may comprise any component that produces a signal with a varying DC component.

In certain embodiments, magnetic sensors, such as a Hall Effect sensor, may detect the flux density and polarity of the generated magnetic field. Specifically, the magnetic sensor may vary its output voltage and/or current in response to the magnetic field.

Further, ripples may be generated as the rotor brushes touch segments of the commutator. The contact creates a short circuit that causes the ripple. When the rotor brush comes in contact with multiple commutator poles and causes a short between adjacent poles, the effective impedance seen by the voltage source decreases. This decrease in impedance leads to an increase in current flowing through the motor. This small impedance change occurs repeatedly and periodically for every rotor commutation. Ripples may be dependent on several factors. For example, the ripple frequency may be dependent on the speed of DC brush motor 110, the load on DC brush motor 110, the number of poles within DC brush motor 110, and any other number of factors that affect the ripple frequency.

Current sensing circuit 120 may have one or more inputs coupled to DC brush motor 110 and one or more outputs coupled to bandpass filter 130. Current sensing circuit 120 may be a wide common-mode range, high-accuracy, bidirectional current shunt monitor.

Current sensing circuit 120 may output a motor-current signal that represents the measured motor current of DC brush motor 110. Specifically, current sensing circuit 120 may measure the BEMF and/or its impedance. In certain embodiments, current sensing circuit 120 may also be biased to provide a bidirectional output to measure both motor rotational directions of DC brush motor 110.

The motor-current signal generated by current sensing circuit 130 may have both a large-amplitude, low-frequency DC component and a small-amplitude, high-frequency AC component. The DC-component current of the motor-current signal is typically the main source driving the inductive load of the motor. The motor load may vary widely depending on the necessary torque to drive the mechanical motor assembly. The AC component current of the motor-current signal, on the other hand, is typically created by the sinusoidal BEMF generated by the motor, as well as the periodic changes in motor coil impedance due to the motor brushes shorting adjacent commutator poles. The amplitude and frequency of the AC component also varies based on the mechanical load on the motor and the design of the motor itself.

The AC component further contains a ripple that is directly proportional to the motor speed of DC motor 120. In certain embodiments, the ripple is cyclical during motor operation. Each ripple corresponds to a commutator pole rotation across the armature brushes. The total sub-divisions of a full rotation can be captured by knowing the total number of poles in the motor. Specifically, the ripple frequency largely depends on the typical rotations per minute of the motor and the total number of commutator poles.

While discussed as motor-current signal, motor-current signal may be any type of signal that contains both a large-amplitude, low-frequency DC component and a small-amplitude, high-frequency AC component.

Bandpass filter 130 may have one or more inputs coupled to current sensing circuit 130 and one or more outputs coupled to DC bias adjustment circuit 140. Bandpass filter 130 may be a low-voltage, rail-to-rail general-purpose operational amplifier. For example, bandpass filter 130 may be limited between 110 Hz and 1.3 kHz. In certain embodiments, bandpass filter 130 may comprise an inverting amplifier topology. Bandpass filter 130 helps remove noise and DC-component variance from the motor current-signal received from current sensing circuit 120. Bandpass filter 130 may be customized based on implementation details of DC brush motor 110 (e.g., motor speed, motor frequency, number of poles, etc.).

DC bias adjustment circuit 140 has one or more inputs coupled to bandpass filter 130 and one or more outputs coupled to comparator 150. DC bias adjustment circuit 140 may bias the sinusoidal ripple waveform around a reference point for comparator 150.

In certain embodiments, DC bias adjustment circuit 140 comprises an operational amplifier. Specifically, DC bias adjustment circuit 140 utilizes the output of bandpass filter 140 as both the positive and negative input for an operational amplifier, but with one side of the operational amplifier as slightly filtered with a low-pass RC filter. This RC filter causes a slight phase shift and attenuation of the motor-current signal, but has little effect on the large DC-bias spike. The common mode (i.e., DC bias) remains the same on both inputs and may be negated by the amplifier in DC bias adjustment circuit 140. However, the phase and amplitude difference between the AC signals on both inputs leads to a differential output retaining the ripple frequency component.

Moreover, DC bias adjustment circuit 140 may comprise a differential gain to provide a large signal swing of the AC signal, and may also re-bias the DC component at a referential voltage for comparator 150.

Comparator 150 may have one or more inputs coupled to DC bias adjustment circuit 150 and one or more outputs coupled to MCU 160. Comparator 150 helps output a square wave with a switching frequency equivalent to the motor ripple frequency. Comparator 150 may be a single rail-to-rail input low-power comparator and may feature an open-drain output for correct level shifting to interface with MCU 160. Comparator 150 generates the final signal used by MCU 160 for counting the ripples. In certain embodiments, comparator 150 utilizes an inverting hysteresis topology to reduce the effects of noise on the one or more inputs of comparator 150. Hysteresis provides a reference point for the comparator that is less susceptible to noise by being set above or below the common mode voltage of the input signal. The feedback resistor sets this hysteresis point and the high and low level reference triggering points for the comparator. This hysteresis is set to be large enough to prevent noise from triggering the comparator as well as low enough that the actual AC signal is correctly captured. Comparator 150 may utilize a reference voltage in order to count the ripple frequency component in the received signal.

MCU 160 may count the number of ripples based on the digital signal from comparator 150. Based on the ripple count, MCU 160 may predict the position of DC brush motor 110. MCU 160 may also implement a form of error correction on the ripple counting. Assorted mechanical effects on the motor, including brush noise and unusual loading conditions, can cause unwanted effects on the measured signal current. These effects can lead to false or missed triggering by comparator 150. MCU 160 may perform error correction by relying on estimations of the motor speed of DC brush motor 110, which are based on the power supply voltage and motor DC current of DC brush motor 110. MCU 160 may then translate the motor speed to an estimated ripple frequency and compare the predicted ripple frequency to the actual ripple frequency. Comparing the estimated ripple frequency to the actual frequency allows MCU 160 to correct the running ripple count for false or missed triggers by comparator 150.

Figure 2:
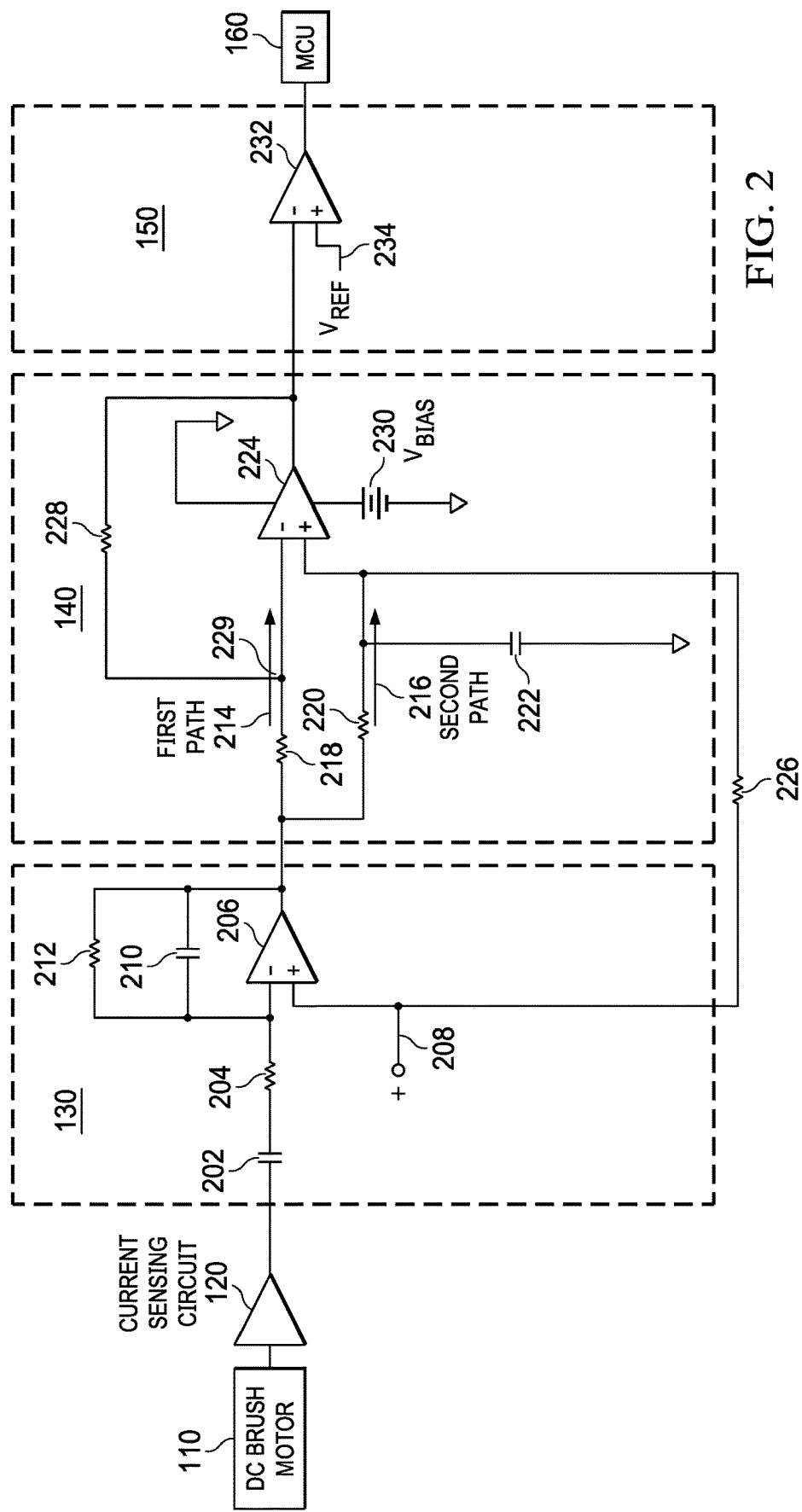
FIG. 2 illustrates an exemplary circuit diagram of a DC brush motor ripple counter.

FIG. 2 illustrates an exemplary circuit diagram of DC brush motor ripple counter 100. DC brush motor ripple counter 100 may comprise DC brush motor 110, current sensing circuit 120, bandpass filter 130, DC bias adjustment circuit 140, comparator 150, and MCU 160.

Current sensing circuit 120 may be a current shunt monitor that outputs a motor-current signal that represents the measured motor current of DC brush motor 110. In certain embodiments, current sensing circuit 120 may provide a bidirectional output that measures both motor rotational directions. Moreover, in certain embodiments, current sensing circuit 120 may also incorporate a common mode RC input filter to reduce the noise generated by DC brush motor 110. Current sensing circuit 120 may transmit the motor current signal to bandpass filter 130. In certain embodiments, current sensing circuit 120 may be any component that produces a signal with a varying DC component.

Bandpass filter 130 may receive the motor current signal from current sensing circuit 120. As illustrated, bandpass filter 130 may be an inverting topology. In an inverting topology, bandpass filter 130 typically outputs a voltage that is the opposite polarity of the input. Bandpass filter 130 may comprise first capacitor 202, first resistor 204, first operational amplifier 206, first referential voltage 208, second capacitor 210, and third resistor 212. Bandpass filter 130 filters motor current signal in order to remove noise and any DC component variance. In certain embodiments, bandpass filter 130 is limited to 100 Hz to 1.3 kHz.

In particular, first capacitor 202 and first resistor 204 may receive the motor current signal from current sensing circuit 120. First capacitor 202 and first resistor 204 combine to form a high pass filter.

Next, the output of first resistor 204 enters into the inverting input terminal of first operational amplifier 206. The noninverting input terminal of first operational amplifier 206 is at first referential voltage 208. The combination of first operational amplifier 206, first referential voltage 208, second capacitor 210, and second resistor 212 form an active inverting low pass filter. Moreover, the combination of first resistor 204 and second resistor 212 also provides gain to the received motor current signal.

Accordingly, bandpass filter 130 transmits a filtered motor current signal to DC bias adjustment circuit 140. DC bias adjustment circuit 140 helps to generate a low noise AC signal that can be measured by comparator 150 with a switching frequency equal to the motor ripple frequency. In addition, as illustrated, DC bias adjustment circuit 140 may also bias the output around a reference point for comparator 150.

The output of bandpass filter 130 is used as both an input to the inverting input and an input to the noninverting input of second operational amplifier 224. First path 214 illustrates a first path of the output of bandpass filter 130 to the inverting input of second operational amplifier 224. Likewise, second path 216 illustrates a second path of the output of bandpass filter 130 to the noninverting input of second operational amplifier 224.

In first path 214, the output of bandpass filter 130 passes third resistor 218 before reaching the noninverting input of second operational amplifier 224. In particular, third resistor 218 may have a resistance of 20 kΩ. In certain embodiments, third resistor 218 may have the same resistance as fourth resistor 220.

In second path 216, the output of bandpass filter 130 passes through a small RC filter (comprising fourth resistor 220 and third capacitor 222) causing a slight phase shift and attenuation of the AC components of the filtered motor current signal. However, the small RC filter has little effect on the DC bias of the filtered motor current signal. In other words, the filtered motor current signal that arrives at the noninverting input of second operational amplifier 224 may have a slightly attenuated and phase shifted AC signal as compared to the filtered motor current signal that arrives at the inverting input of second operational amplifier 224. But the filtered motor current signal that arrives at the noninverting input of second operational amplifier 224 may have a similar DC signal as compared to the filtered motor current that arrives of the inverting input of second operational amplifier 224. In an example embodiment, fourth resistor may have a resistance of 20 kΩ, and the capacitance of third capacitor 222 may be 1,500 pF.

Second operational amplifier 224 may be a differential amplifier, and may output the difference between the current received at the noninverting input of second operational amplifier 224 (i.e., the filtered motor current with a slightly attenuated and phase shifted AC signal) and the current received at the inverting input of second operational amplifier 224 (i.e., the filtered motor current). Accordingly, the second operational amplifier 224 may negate the DC bias (even if the motor is experiencing a large DC spike due to a start or stop condition) and output an AC signal that has a switching frequency equivalent to the motor ripple frequency.

Fifth resistor 226 may provide an additional bias to the noninverting input of second operational amplifier 224. In particular, fifth resistor 226 may be used to bias the output of DC bias adjustment circuit 140 around a reference point for comparator 150. Vbias 230 is the power supply for second operational amplifier 224. Vbias 230 may comprise a voltage that powers second operational amplifier 224 such that second operational amplifier 224 captures the entire input voltage range. Sixth resistor 228 may be used as a feedback resistor to provide gain to the output of DC bias adjustment circuit 140.

Node 229 is a circuit point that receives a signal traversing first path 214 (i.e., motor-current signal) and output of second operational amplifier 224. Node 229 also feeds into an inverting input of second operational amplifier 224.

The output of DC bias adjustment circuit 140 is coupled to an input of comparator 150. In particular, the output of DC bias adjustment circuit 140 is coupled to the inverting input of third operational amplifier 232. In addition, the noninverting input of third operational amplifier 232 may be at referential voltage 234.

Third operational amplifier 232 may be a comparator that compares the output of DC bias adjustment circuit 140 to referential voltage 234. In certain embodiments, an inverting hysteresis topology can be utilized to reduce the effects of noise and input on third operational amplifier 232. Reference voltage 234 may be tied to the output of comparator amplifier 232 with a feedback resistor. Depending on the output of the comparator, the feedback resistor will change the voltage at which the comparator will toggle to the opposite state. This creates two separate threshold voltages, $V_{th}$ and $V_{tl}$, providing an operating range for which the comparator will correctly trigger and not be affected by noise. Each transition from a high-to-low or low-to-high output of the comparator immediately changes the reference voltage at which the input voltage will cause the comparator to again transition to the opposite state. Moreover, third operational amplifier 232 may be centered at a reference point. The referential voltage is typically biased based on the center point voltage of bandpass filter 103 and/or DC bias adjustment circuit 140.

The output of comparator 150 is then transmitted to MCU 160. MCU 160 may count the number ripples based on the output of comparator 150. For example, MCU 160 may count the number of ripples based on the digital signal from comparator 150. Based on the ripple count, MCU 160 may predict the position of DC brush motor 110. In certain embodiments, MCU 160 may also implement a form of error correction on the ripple counting.

Figure 3:
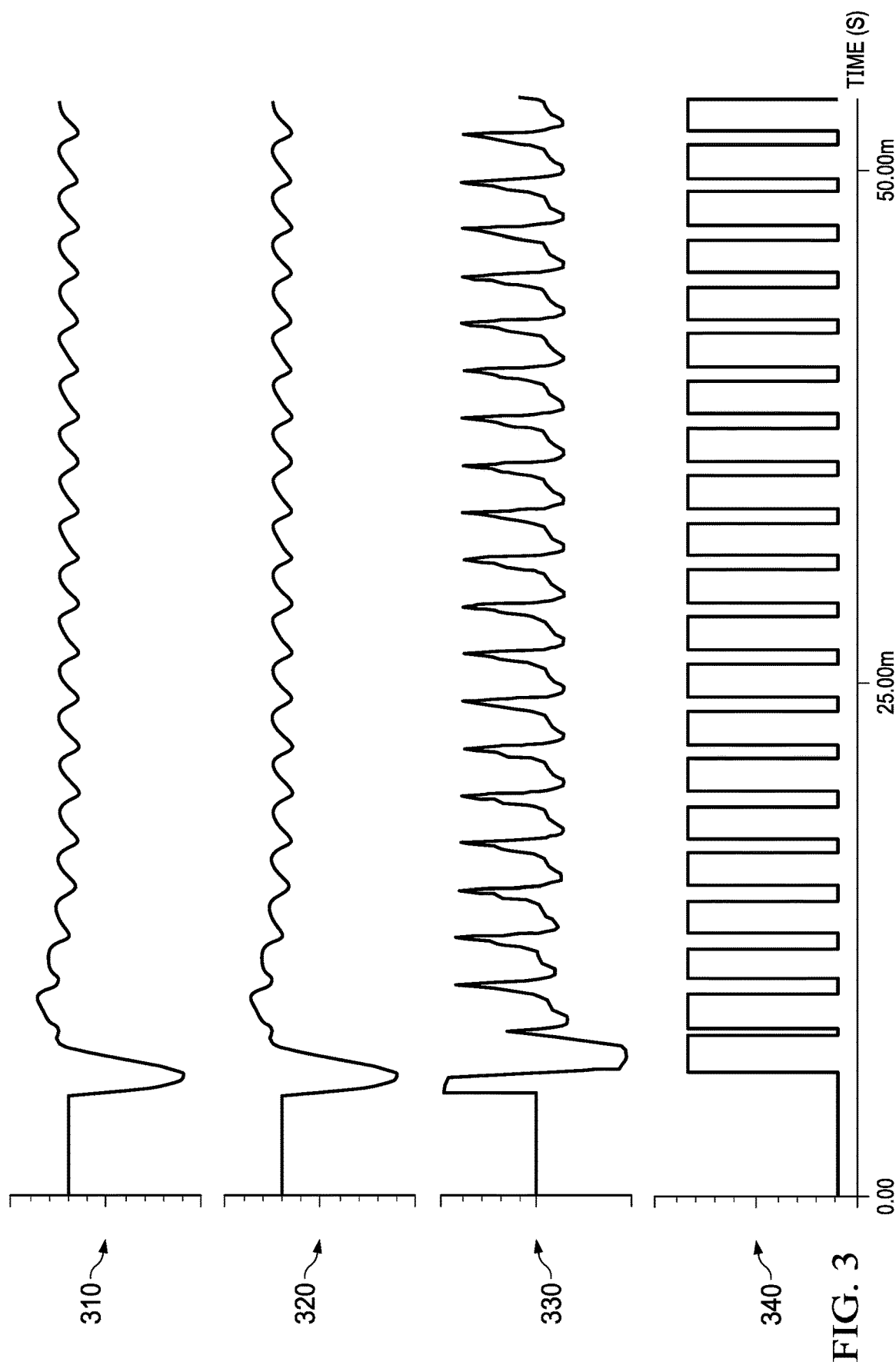
FIG. 3 illustrates an exemplary signal diagram from various components in a DC brush motor ripple counter.

FIG. 3 illustrates an exemplary signal diagram from various components in DC brush motor ripple counter 100.

First path signal 310 illustrates an example signal in first path 214. As described above, first path 214 illustrates a first path of the output of bandpass filter 130 to the inverting input of second operational amplifier 224. First path signal 310 represents a non-attenuated signal from bandpass filter 140.

Second path signal 320 illustrates an example signal in second path 216. As described above, second path 216 illustrates a second path of the output of bandpass filter 130 to the noninverting input of second operational amplifier 224. Second path signal 310 represents an attenuated signal from bandpass filter 140. The attenuation of second path signal 210 occurs as the signal from bandpass filter 130 is slightly filtered with a low-pass RC filter. Note that second path signal 320 may have a similar DC component as compared to first path signal 310, but second path signal 320 may have a slight phase shift and attenuation of the AC components as compared to first path signal 310.

Motor ripple signal 330 represents the output signal from DC bias adjustment circuit 140. DC bias adjustment circuit 140 communicates motor ripple signal 330 to comparator 150. In certain embodiments, motor ripple signal 330 is a sinusoidal wave that represents the comparison of first path signal 310 and second path signal 320. Due to the subtraction of the current received at the noninverting input of second operational amplifier 224 (i.e., the filtered motor current with a slightly attenuated and phase shifted AC signal) and the current received at the inverting input of second operational amplifier 224 (i.e., the filtered motor current), motor ripple signal may represent a signal that negates the DC bias (even if the motor is experiencing a large DC spike due to a start or stop condition) while retaining the AC component that has a switching frequency equal to the motor ripple frequency.

In addition, DC bias adjustment circuit 140 may bias motor ripple signal 330 around a reference point for comparator 150. Moreover, DC bias adjustment circuit 140 may comprise a differential gain to provide a large signal swing of the AC signal of motor ripple signal 330, and may also re-bias the DC component at a referential voltage for comparator 150.

Digital motor ripple signal 340 represents the output signal from comparator 150. Comparator 150 generates the final signal used by MCU 160 for counting the ripples by comparing motor ripple signal 330 to referential voltage 234. In certain embodiments, digital motor ripple signal 340 is a square wave with a switching frequency equivalent to the motor ripple frequency. MCU 160 may count the number of ripples based on the digital signal from comparator 150. Based on the ripple count, MCU 160 may predict the position of DC brush motor 110.

Figure 4:
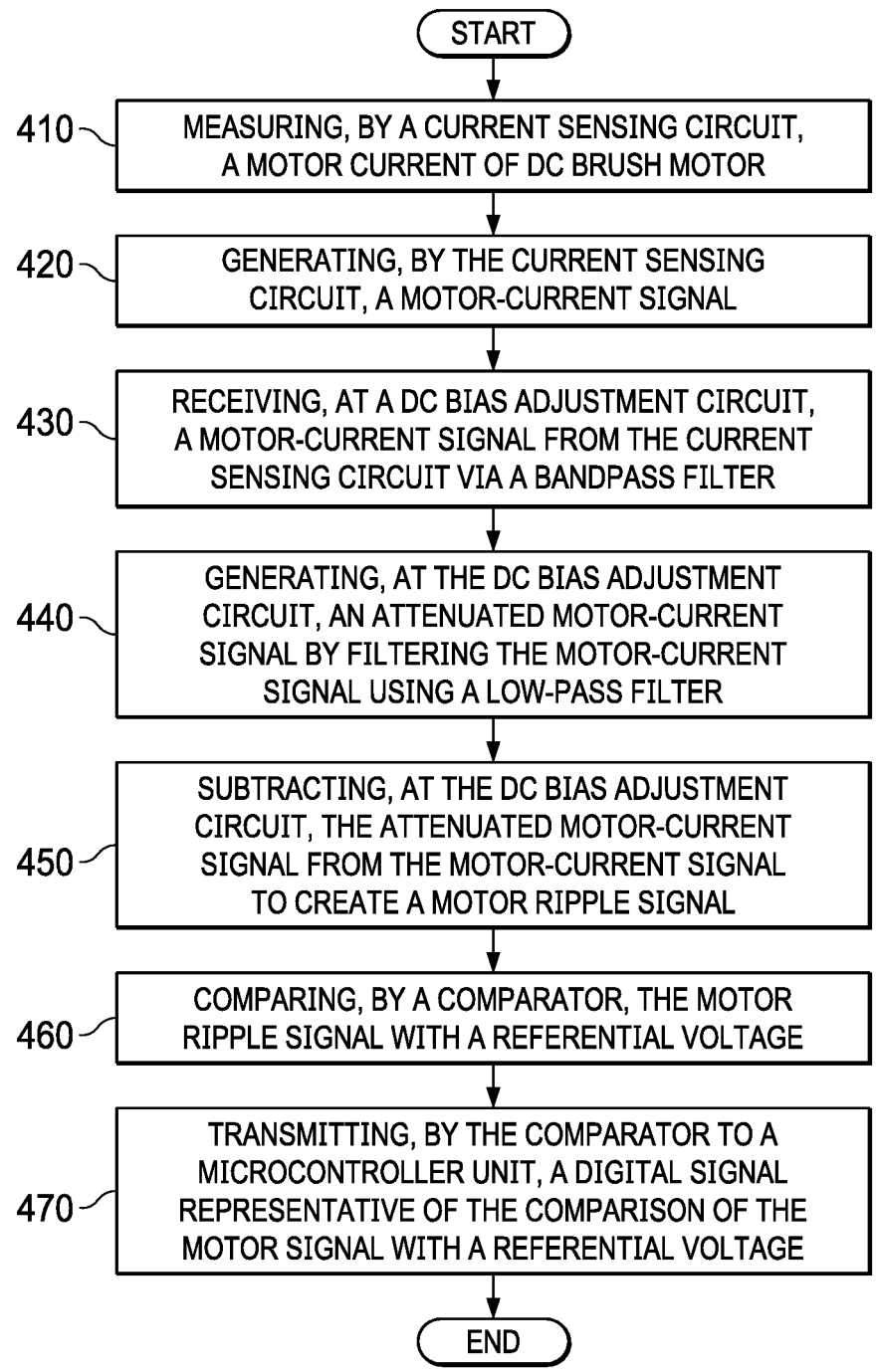
FIG. 4 illustrates an example method for providing a digital logic level series of rising and falling edges retaining the ripple frequency component of a DC brush motor.

FIG. 4 illustrates an example method 400 for providing a digital logic level series of rising and falling edges retaining the ripple frequency component of DC brush motor 110. The method may begin at step 410, where current sensing circuit 120 measures a motor current of DC brush motor 110. At step 420, current sensing circuit 120 generates a motor-current signal that represents the measured motor current of DC brush motor 110.

At step 430, DC bias adjustment circuit 140 receives the motor-current signal from current sensing circuit 120 via bandpass filter 130. Bandpass filter 130 helps remove noise and DC-component variance from the motor current-signal received from current sensing circuit 120.

At step 440, DC bias adjustment circuit 140 generates an attenuated motor-current signal by filtering the motor-current signal using a low-pass filter. The low-pass filter causes a slight phase shift and attenuation of the AC component of the motor-current signal, but has little effect on the large DC-bias spike.

At step 450, DC bias adjustment circuit 140 subtracts the attenuated motor-current signal from the non-attenuated motor-current signal to create a motor ripple signal. Because DC bias adjustment circuit 150 subtracts the attenuated signal (i.e., the filtered motor current with a slightly attenuated and phase shifted AC signal) from the non-attenuated signal (i.e., the filtered motor current), the motor ripple signal primarily incorporates the AC signal that has a switching frequency equal to the motor ripple frequency while negating the DC bias (even if the motor is experiencing a large DC spike due to a start or stop condition).

At step 460, comparator 150 compares the motor ripple signal with a referential voltage. The referential voltage is typically biased based on the center point voltage of band-pass filter 130 and/or DC bias adjustment circuit 140.

At step 470, comparator 150 transmits a digital signal representative of the comparison of the motor ripple signal with a referential voltage to MCU 160. The digital signal may represent a series of rising and falling edges retaining the ripple frequency component for MCU 160 to count and analyze even during start and stop conditions of DC motor brush 110.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for providing a digital logic level series of rising and falling edges retaining the ripple frequency component including the particular steps of the method of FIG. 4, this disclosure contemplates any suitable method for providing a digital logic level series of rising and falling edges retaining the ripple frequency component including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus comprising:
   a first differential amplifier having a first amplifier input, a first reference voltage input, and a first amplifier output;
   a high pass filter coupled to the first amplifier input;
   a low pass filter coupled between the first amplifier input and the first amplifier output;
   a second differential amplifier having a second amplifier input, a second reference voltage input, and a second amplifier output, the second amplifier input coupled to the first amplifier output, and the second reference voltage input coupled to the first reference voltage input; and
   a comparator having first and second comparator inputs, the first comparator input coupled to the second amplifier output, and the second comparator input is coupled to a second reference voltage input.

2. The apparatus of claim 1, in which the second amplifier input is an inverting input and the second reference voltage input is a non-inverting input.

3. The apparatus of claim 1, in which the first comparator input is an inverting input and the second comparator input is a non-inverting input.

4. The apparatus of claim 1, in which the low pass filter is a first low pass filter, and including a second low pass filter coupled to the second amplifier input.

5. The apparatus of claim 4, in which the second low-pass filter is a resistor-capacitor circuit.

6. The apparatus of claim 1, in which the high pass filter and low pass filter form a bandpass filter.

7. The apparatus of claim 6, in which the bandpass filter has a pass band between 110 Hz and 1.3 kHz.

8. The apparatus of claim 1, in which the first amplifier input is configured to be coupled to a DC motor.

9. The apparatus of claim 8, in which the current sensing circuit is configured to:
   measure a motor current of the DC motor; and
   provide a signal proportional to the motor current.

10. The apparatus of claim 1, in which the first amplifier output is coupled to the second amplifier input and to the second reference input via respective resistors.

11. The apparatus of claim 1, in which the second differential amplifier receives its power from a bias voltage source.

12. The apparatus of claim 1, in which the second reference voltage input is coupled to the first reference voltage input via a resistor.

* * * * *